US009211864B2

(12) United States Patent
Hock et al.

(10) Patent No.: US 9,211,864 B2
(45) Date of Patent: Dec. 15, 2015

(54) TETHER ATTACHMENT ARRANGEMENT FOR A VEHICLE AIRBAG CUSHION AND METHOD OF ATTACHING

(75) Inventors: Christopher Hock, Oxford, MI (US); Martha Vazquez, North Ogden, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 13/357,439

(22) Filed: Jan. 24, 2012

(65) Prior Publication Data
US 2013/0187369 A1 Jul. 25, 2013

(51) Int. Cl.
*B60R 21/2338* (2011.01)
*B60R 21/235* (2006.01)

(52) U.S. Cl.
CPC ............ *B60R 21/2338* (2013.01); *B60R 21/235* (2013.01); *B60R 2021/23382* (2013.01); *B60R 2021/23538* (2013.01)

(58) Field of Classification Search
CPC .................. B60R 21/2338; B60R 2021/23382
USPC .............................. 280/743.2, 743.1, 731–733
See application file for complete search history.

(56) References Cited

U.S. PATENT DOCUMENTS

| | | | | |
|---|---|---|---|---|
| 5,078,423 A * | 1/1992 | Fujita | ........................... | 280/743.2 |
| 5,378,011 A * | 1/1995 | Rogerson et al. | ........... | 280/728.1 |
| 5,669,632 A * | 9/1997 | Johnson et al. | ............. | 280/743.2 |
| 5,954,361 A * | 9/1999 | Lang | ........................... | 280/743.2 |
| 6,086,096 A * | 7/2000 | Link et al. | ................... | 280/743.2 |
| 6,241,283 B1 * | 6/2001 | Zarazua | ...................... | 280/743.2 |
| 6,302,433 B1 * | 10/2001 | Ellerbrok et al. | ............. | 280/729 |
| 6,345,841 B2 * | 2/2002 | Igawa et al. | ..................... | 280/740 |
| 6,705,811 B1 | 3/2004 | Selby | | |
| 7,452,002 B2 * | 11/2008 | Baumbach et al. | ......... | 280/743.2 |
| 7,673,899 B2 | 3/2010 | Abe | | |
| 7,837,228 B2 * | 11/2010 | Abe | ........................... | 280/743.1 |
| 8,025,311 B2 | 9/2011 | Nakayama | | |
| 8,469,397 B2 * | 6/2013 | Baca et al. | ..................... | 280/733 |
| 2010/0259035 A1 | 10/2010 | Webber | | |
| 2012/0261911 A1 * | 10/2012 | Baca et al. | ..................... | 280/733 |

FOREIGN PATENT DOCUMENTS

CA 2085702 (A1) 7/1993
EP 2 028 103 A2 2/2009

OTHER PUBLICATIONS

Int'l Search Report, Mail Date: Mar. 22, 2013; Int'l App. No. PCT/US2013/022910, Int'l Filing Date: Jan. 24, 2012, (3) pgs.
Written Opinion of the International Searching Authority, Mail Date: Mar. 22, 2013; Int'l App. No. PCT/US2013/022910, Int'l Filing Date: Jan. 24, 2012; (8) pgs.

* cited by examiner

*Primary Examiner* — James English
(74) *Attorney, Agent, or Firm* — The Small Patent Law Group LLC; Christopher R. Carroll

(57) ABSTRACT

Tether attachment arrangements for a vehicle airbag cushion and methods for attaching tethers to inflatable cushions are provided. One inflatable cushion assembly includes an inflatable cushion having an interior and a tether disposed within the interior of the inflatable cushion. The tether has at least one portion attached to the interior of the inflatable cushion. The inflatable cushion assembly also includes a circuitous stitching at the portion attaching the tether to the interior of the inflatable cushion.

13 Claims, 7 Drawing Sheets

TETHER ATTACHMENT ARRANGEMENT FOR A VEHICLE AIRBAG CUSHION AND METHOD OF ATTACHING

BACKGROUND OF THE INVENTION

The subject matter disclosed herein relates generally to inflatable vehicle airbag cushions, and more particularly to tethers for inflatable vehicle airbag cushions, especially for vehicle steering wheels.

Vehicles, particularly passenger vehicles, often include one or more airbags to protect the occupant(s) during crashes. In particular, one or more inflatable cushions, typically referred to as airbags, inflate to protect and/or restrain the head and torso of the occupant(s). For example, steering wheels for vehicles, such as steering wheel/driver airbag assemblies often include an inflatable airbag for protecting the driver during a crash or other collision.

Vehicle airbags also often include one or more tethers attached thereto that can restrain the extent of the inflation or deformation of the airbag. These tethers are attached to the main panels of the airbag with straight sew lines. These straight sew lines concentrate the snap load during deployment (when the air inflates) on a single thread strand in one direction. Thus, the straight sew lines do not necessarily provide an airbag with robust attachment of the tether(s), which may result in failure during deployment. For example, during inflation, one or more straight sew lines may become detached from the airbag panel, causing the airbag to expand beyond desired limits and potentially increase the likelihood of injury to the occupant(s) from the airbag deployment. Accordingly, known tether attachment methods for airbags may not provide adequate coupling resulting in failure of the attachment.

BRIEF DESCRIPTION OF THE INVENTION

In accordance with various embodiments, an inflatable cushion assembly for a vehicle is provided. The inflatable cushion assembly includes an inflatable cushion having an interior and a tether disposed within the interior of the inflatable cushion. The tether has at least one portion attached to the interior of the inflatable cushion. The inflatable cushion assembly also includes a circuitous stitching at the portion attaching the tether to the interior of the inflatable cushion.

In accordance with other embodiments, an inflatable cushion assembly is provided that includes an inflatable cushion having front and back panels joined together to define an inner portion. The inflatable cushion assembly also includes a tether sewn to at least one of the front and back panels within the inner portion using one of a circular stitching pattern or a spiral stitching pattern that crosses a plurality of lines of thread along one direction.

In accordance with yet other embodiments, a method for attaching a tether to an inflatable cushion of an airbag assembly is provided. The method includes aligning at least one tether with a panel of an inflatable cushion of an airbag assembly and sewing the tether to the panel using a circuitous stitching pattern that crosses a plurality of lines of thread in one direction.

DETAILED DESCRIPTION OF THE INVENTION

Figure 1:
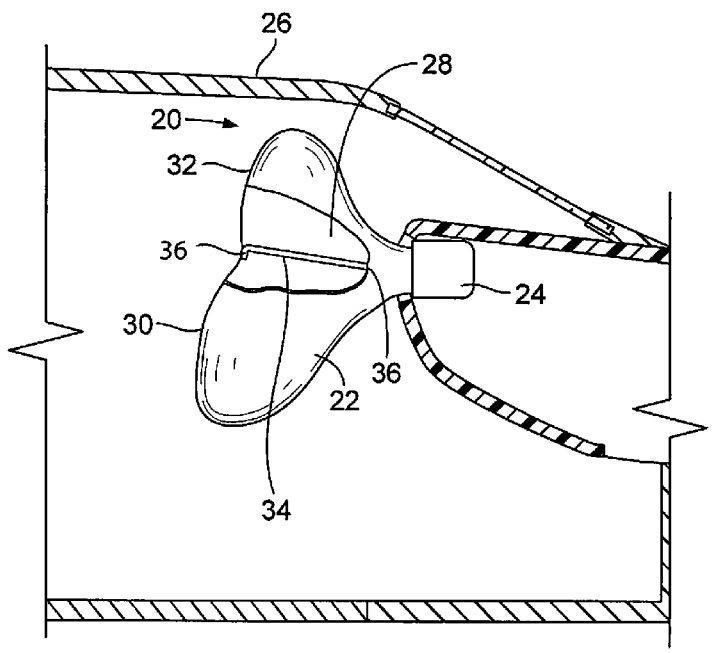
FIG. 1 is a diagrammatic view of a vehicle having an inflatable cushion assembly in which tether attachment arrangements in accordance with various embodiments may be implemented.

The foregoing summary and brief description of drawings, as well as the following detailed description of certain embodiments, will be better understood when read in conjunction with the appended drawings. To the extent that the figures illustrate diagrams of the functional or operational blocks of various embodiments, the functional or operational blocks are not necessarily indicative of the division between hardware or circuitry. Thus, for example, one or more of the functional or operational blocks may be implemented in a single piece of hardware or circuitry or multiple pieces of hardware or circuitry. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments provide tether attachment arrangements for inflatable vehicle airbag cushions, particularly airbag cushions for steering wheel assemblies. However, it should be noted that although the various embodiments are described herein in connection with airbag cushions for steering wheel assemblies, the tether attachment arrangements may be used in connection with inflatable cushions (or airbags) installed within different portions of a vehicle, for example, within a side door or instrument panel.

By practicing at least one embodiment, a more robust attachment of one or more tethers to an airbag cushion is provided. Additionally, by practicing at least one embodiment, the load of the tether attachment also is distributed among several thread strands in a direction on one or more main panels of the airbag cushion, as well as on the tether.

FIG. 1 illustrates an inflatable cushion assembly 20 that generally includes an inflatable cushion 22, which often is referred to as an airbag, and a housing 24. In the illustrated embodiment, the inflatable cushion 22 is shown deployed, for example, in response to a sensed vehicle crash or collision. Prior to deployment, the inflatable cushion 22 is generally folded and stored in the housing 24 using any suitable method, which is installed in an automotive vehicle 26. In operation, activation of the inflatable airbag cushion assembly 20 deploys the inflatable cushion 22 by inflating the cushion (such as through explosive or pyrotechnic means) to protect an occupant (not shown) of the vehicle 26, such as in a driver's seat (not shown).

In various embodiments, the inflatable cushion 22 is formed from a single layer of fabric material, such as polyester and nylon material, thereby generally defining an inflatable fabric cushion. The inflatable cushion 22 defines an interior 28 and includes an area 30 for restraining a torso of occupant and an area 32 for restraining a head of the occupant. In general, restraining generally includes reducing the effects of an impact or collision of the vehicle 26 upon the occupant.

The inflatable airbag cushion assembly 20 also includes a tether 34 attached to the inflatable cushion 22 using one or more tether attachment arrangements described in more detail herein. The tether 34 includes one or more attachment portions, illustrated as an attachment end 36 that is attached by stitching arrangements to an interior surface 38 of the inflatable cushion 22. The attachments end(s) 36 may be at the end(s) of the tether 34 or a distance from the end(s) of the tether 34. In some embodiments, the attachment may be along any portion of the tether 34. It should be noted that the tether 34 may be attached to a front panel 40 and/or back panel 42 (shown in FIG. 2) of the inflatable cushion 22. Thus, the attachment end(s) 36 may be coupled adjacent to the area 30 and/or 32, or on a side generally opposite to the area 30 and/or 32. In some embodiments, half tethers or multiple tether portions may be provided that are attached together at a side of the inflatable cushion 22.

Figure 2:
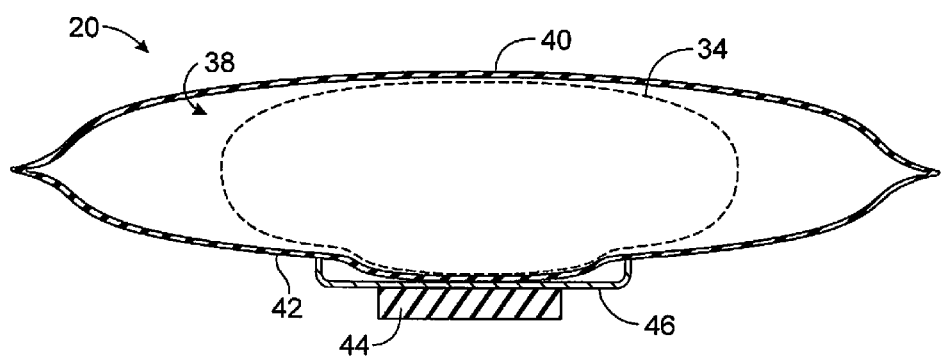
FIG. 2 is a diagram illustrating a sectional view of an inflatable cushion in which a tether attachment arrangement in accordance with various embodiments may be implemented.

The inflatable airbag cushion assembly 20 as shown in FIG. 2 also generally includes an inflator 44 coupled to the inflatable cushion 22 using any suitable means. Additional components may be provided, for example, a mounting plate 46, which may include attachment components, such as a retainer plate for coupling the inflatable cushion 22 within the housing 24 (shown in FIG. 1).

It should be noted that the main body of the inflatable cushion 22 may be formed in any suitable manner. For example, two circular pieces (defining the front panel 40 and back panel 42) of suitable airbag cushion material, such as of suitable woven material or fabric, may be laid one on top of the other and a seam formed about the periphery. In general, the inflatable cushion 22 is formed from a suitable material to prevent or limit the passage of inflation fluid therethrough (e.g., using a coating or having a tight weave). However, the various embodiments are not limited to a particular material or manufacturing process.

The inflator 44 operates, in any suitable manner known in the art, to generate, produce, form or otherwise provide inflation gas for the inflation of the inflatable cushion 22. For example, inflator devices may include compressed stored gas inflators, pyrotechnic inflators and hybrid inflators. Accordingly, in operation, such as upon the sensing of a collision, an electrical signal is sent to the inflator 44 and results in the discharge of inflation gas into the interior of the inflatable cushion 22.

Figure 3:
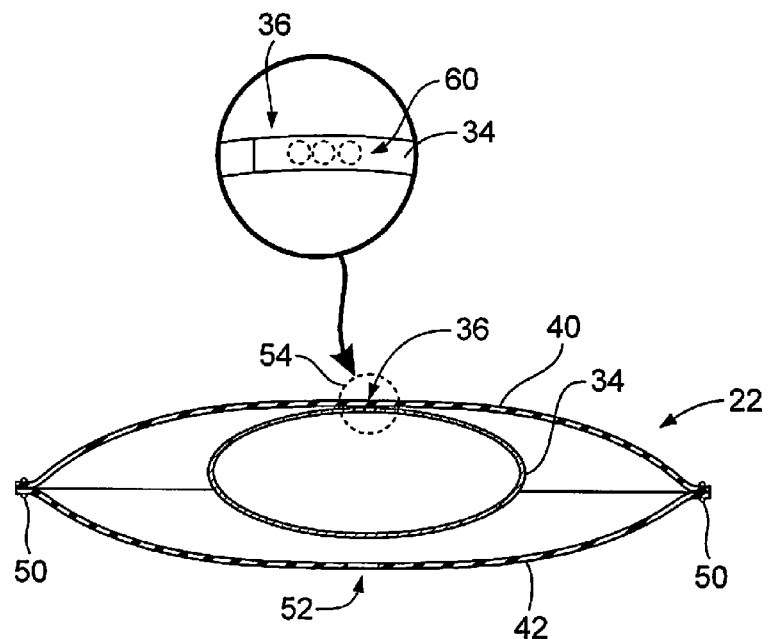
FIG. 3 is a simplified sectional view of an inflatable airbag showing a tether attached to the inflatable cushion in accordance with an embodiment.
Figure 4:
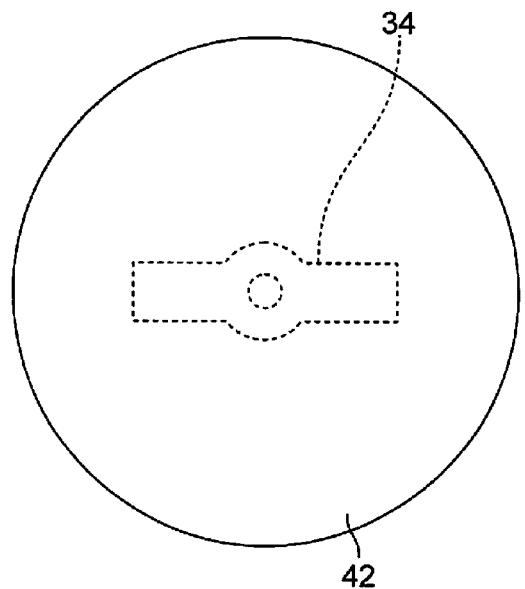
FIG. 4 is a simplified plan view of the inflatable airbag of FIG. 5.

FIGS. 3 and 4 illustrate the inflatable cushion 22 having the tether 34 attached thereto in accordance with one embodiment. The inflatable cushion 22, in this embodiment, includes the generally circular front and back panels 40 and 42 with the respective peripheries thereof generally joined together by stitching 50 (e.g., a double stitch sew line). The back panel 42 of the inflatable cushion 22 also includes a generally centrally located or positioned cushion attachment opening or hole 52. The inflatable cushion 22 includes the tether 34, which in this embodiment is an internal tether within the inflatable cushion 22. The tether 34 is attached to the inner surface of the inflatable cushion 22 at one or more locations, such as using the attachment end(s) 36 of the tether 34.

The tether 34 is attached to the inner surface of the inflatable cushion 22, for example, as shown in the exploded view portion of FIG. 3, wherein the tether 34 is joined with the front panel 40 of the inflatable cushion 22 by sewing to the inside of the front panel 40 at an area 54 using a stitching pattern 60 as described in more detail herein. In general, the stitching pattern 60 is any pattern of sewing of the tether(s) 34 that crosses multiple strands of thread along a load direction (e.g., a load caused by deployment of the inflatable cushion 22). For example, the stitching pattern 60 in various embodiments may be any pattern that does not include straight sew lines, such as a pattern that is not a box stitch pattern, such as a square box stitch pattern.

It should be noted that any suitable thread and sewing process may be used for performing the sewing and attaching the tether(s) 34 to the inflatable cushion 22. Thus, the stitching pattern 60 in various embodiments is configured to distribute the load (when the inflatable cushion 22 is deployed) across more than one thread. For example, loads are applied to the tether(s) 34 by the forward motion of the inflatable cushion 22 during inflation, which motion is stopped by the tether(s) 34 therein. It also should be noted that the tether 34 may include an opening therethrough aligned with the hole 52 in the inflatable cushion 22.

Figure 5:
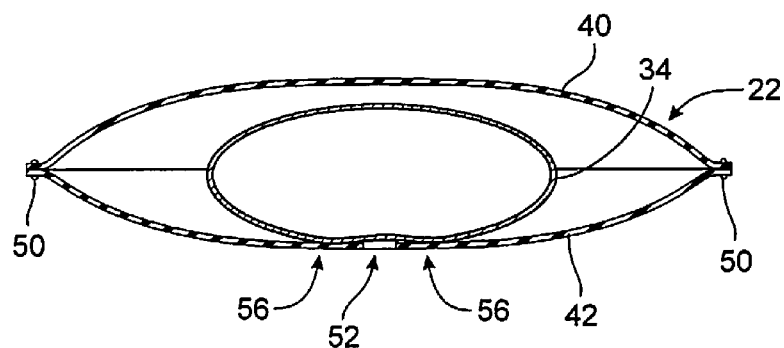
FIG. 5 is a simplified sectional view of an inflatable airbag showing a tether attached to the inflatable cushion in accordance with another embodiment.
Figure 6:
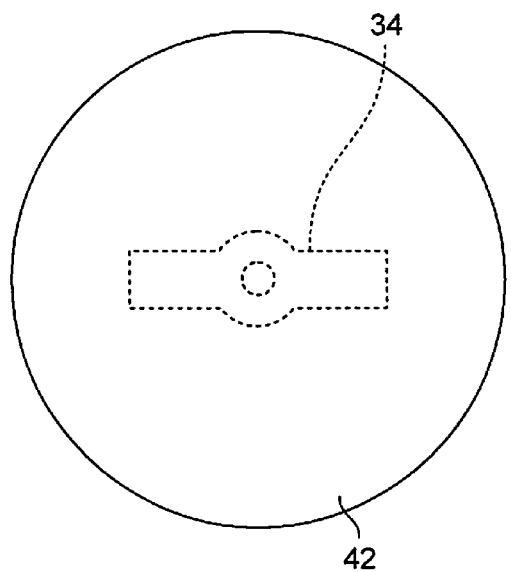
FIG. 6 is a simplified plan view of the inflatable airbag of FIG. 5.

The tether 34 may be attached to different locations within the inflatable cushion 22, such as to the rear panel 42 and at multiple areas 56 therein as shown in FIGS. 5 and 6. Thus, the tether 34 is joined with the rear panel 42 of the inflatable cushion 22 by sewing to the inside of the rear panel 42 at the areas 56 using the stitching pattern 60 or other stitching pattern as described in more detail herein. It should be noted that the attachment of the tether 34 to the inflatable cushion 22 may be provided at symmetrical or asymmetrical locations.

Figure 7:
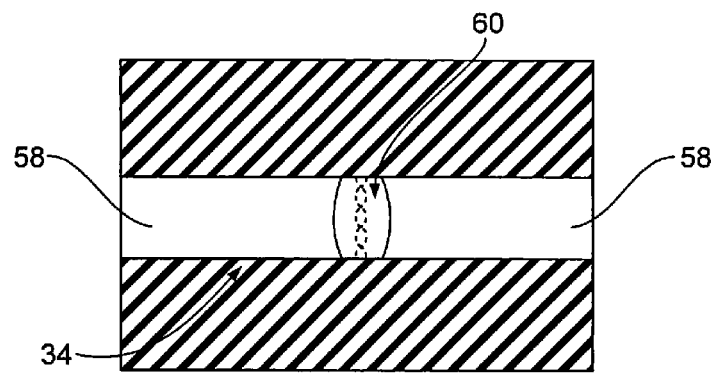
FIG. 7 a simplified sectional view of an inflatable airbag showing a tethers attached to the inflatable cushion in accordance with another embodiment

In some embodiments, more than one tether 34 may be used or the tether 34 may be formed from several tether portions 58 as shown in FIG. 7. For example, as illustrated therein the tether portions 58 may be two-half tethers sewn together using the stitching pattern 60.

In various embodiments, the stitching pattern 60, in particular, the number of strands or seams defining the stitching pattern 60 may be based on the load that will be applied to the tether(s) 34 when the inflatable cushion 22 is deployed. For example, additional strands or seams or tighter stitching may be used as the potential load during deployment of the inflatable cushion 22 increases. Thus, the stress concentrated on a single strand or weave may be distributed across additional strands.

In some embodiments, the stitching pattern 60 includes a sew pattern wherein the tether(s) 34 are attached to the inflatable cushion 22 with any alignment that is not a forty-five degree alignment of the weave to the sew direction, such as illustrated in FIGS. 8 through 13. However, it should be noted that the stitches defining various patterns described herein are not limited to a particular arrangement or configuration. For example, the stitching pattern 60 in various embodiments is generally any type of circuitous stitching that defines a pattern of sewing that crosses multiple strands of thread, particularly along a single load direction.

Figure 8:
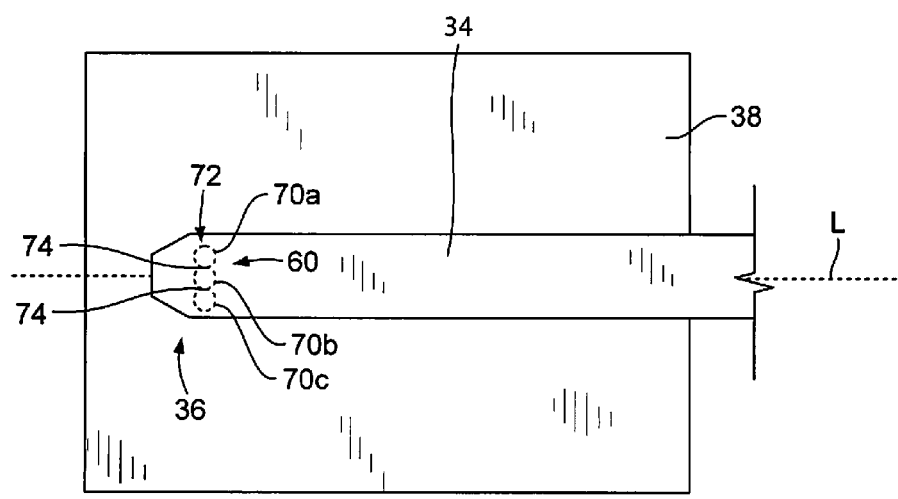
FIG. 8 is a diagram illustrating a stitching pattern in accordance with one embodiment attaching a tether to an inflatable cushion.

In one embodiment, as shown in FIG. 8 the stitching pattern 60 includes generally circular seams 70 defined by a round sewing pattern that crosses multiple lines of thread, such as across one side of the circular seam 70 and the across the other side of the circular seam 70. In this embodiment, the generally circular seams 70 may be stitched in a continuous pattern. However, the circular seams 70 also may be separately or individually sewn. It should be noted that the size and orientation of the circular seams 70 may be changed as desired or needed. For example, while the circular seams 70 are illustrated in a generally aligned configuration, one or more of the circular seams 70 may be offset from one or more of the other circular seams 70. For example, the middle circular seam 70b shown in FIG. 8 may be shifted left or right (as shown in FIG. 7) relative to the circular seams 70a and 70b. Additionally, although the circular seams 70 are shown as generally adjacent one another, spacing may be provided between one or more of the circular seams 70 such that a cross-stitch exist therebetween.

Thus, the circular seams 70 are stitched such that adjacent circular seams 70 are connected at cross points 72. It should be noted that one or more portions of the circular seams 70, such as one or more of halves of some of the circular seams 70, or all of some of the circular seams 70 may be formed from more than a single stitch seam. Fore example, some portions of the circular seams 70 may be formed from multiple stitch seams, which may be based on where the stitching for the circular seams 70 begin and end. Also, concentric circular seams 70 may be provided in some embodiments.

In various embodiments, more or less circular seams 70 are provided. For example, although three circular seams 70 are illustrated in FIG. 8 additional or fewer circular seams 70 may be sewn. Also, although a single row 72 of circular seams 70 is shown, multiple rows, such as multiple parallel rows may be provided. The multiple rows of circular seams 70 may be formed from separate sewing patterns or from a continuous circular pattern. In some embodiments, an array of circular seams 70 may be provided (e.g., a three by three array of circular seams 70).

Figure 9B:
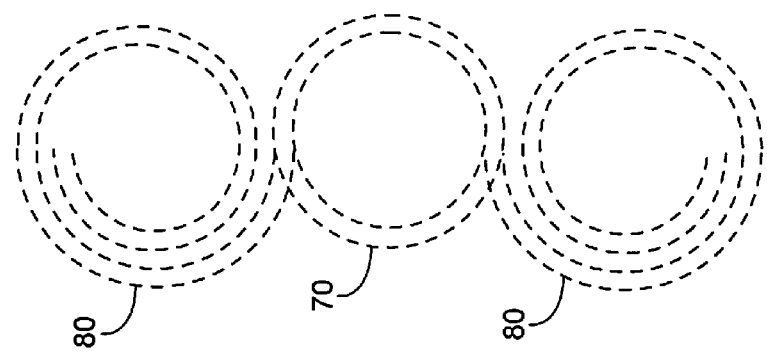
FIGS. 9A and 9B are diagrams illustrating stitching patterns in accordance with other embodiments for attaching a tether to an inflatable cushion.
Figure 9A:
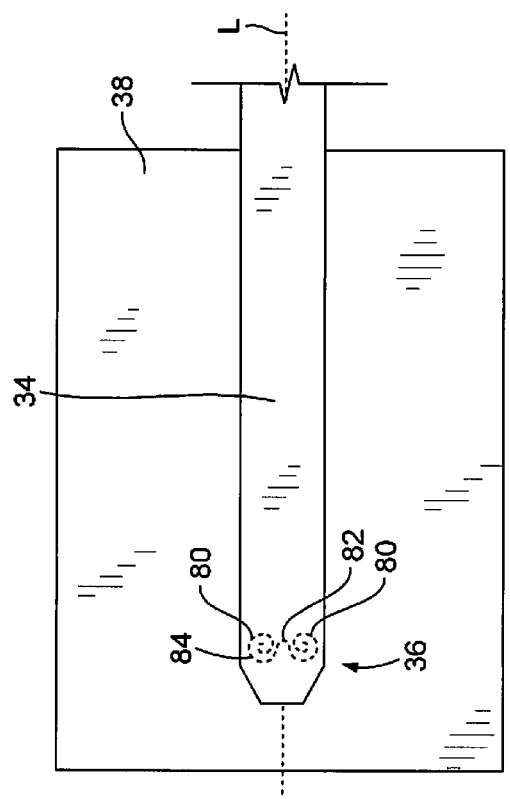

In another embodiment, as shown in FIG. 9A, spiral seams 80 may be provided. The spiral seams 80 provide an additional reinforcement to the sew and also allows for a continuous sewing if desired or needed. Also, the connecting seam 82 between the spiral seams 80 may be made longer or shorter. The spiral seams 80 are formed from stitches that define a curve on a plane that extends around a center point 84. The curve pattern may be sewn to have a continuously increasing or decreasing distance from the center point 84, such that a varying distance is provided. The number of turns in each of the spiral seams 80 may be the same or different, and may be based on the load that will be applied to the tether 34 when the inflatable cushion 22 deploys. As shown in FIG. 9A, a double end or double spiral pattern is provided. Again it should be noted that variations and modifications as discussed above are contemplated, for example, changing the number of spiral seams 80. Also, in some embodiments, an array of spiral seams 80 may be provided (e.g., a three by three array of spiral seams 80). Additionally, the spiral seams 80 may include a plurality of concentric spirals, for example, having at least two arcuate portions wherein in one arcuate portion is radially inward from another arcuate portion.

It should be noted that various embodiments may be combined. For example, the stitching pattern 60 may include one or more circular seams 70 and one or more spiral seams 80 in the same stitching pattern. For example, an alternating pattern of circular seams 70 and spiral seams 80 may be provided as shown in FIG. 9B, which may be constant in pattern or varying. Accordingly, every other seam may alternate between circular seams 70 and spiral seams 80 or more than one circular seam 70 or spiral seam 80 may be provided in a row adjacent each other. Additionally, the pattern again may be aligned or offset as described herein.

Also, it should be noted that although the stitching patterns described herein are shown generally perpendicular to a longitudinal axis (L) of the tether 34 (as shown in FIGS. 8 and 9A), the stitching pattern, in particular, one or more of the seams forming the stitching patterns, may be sewn non-perpendicular to the axis L, for example, an obtuse angle. Additionally, one or more of the seams may be sewn transverse to the axis L, such as at an acute angle.

Figure 10:
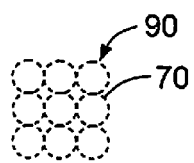
FIG. 10 is a diagram illustrating a stitching pattern array in accordance with an embodiment.

The combination may include different seam patterns or the same seam pattern sewn in a different manner. For example, one or more embodiments of seams may be sewn into an array. The array may be a square array 90 as shown in FIG. 10. It should be noted that although the square array 90 is shown having circular seams 70, different seam patterns, such as the spiral seams 80, or combinations thereof, may be provided.

Figure 11:
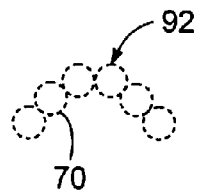
FIG. 11 is a diagram illustrating a stitching pattern array in accordance with another embodiment.
Figure 12:
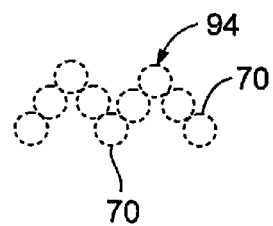
FIG. 12 is a diagram illustrating a stitching pattern array in accordance with another embodiment.

In some embodiments, the array may take on other shapes or configurations, such as a rectangle, circle, oval, polygon or ring, among others. Additionally, the array may take a symmetric or asymmetric stitching pattern and have non-geometric components. For example, FIG. 11 illustrates an arc array 92, which may be continued to form a ring array. As another example, a wave array 94 as shown in FIG. 12 may be provided. These are merely examples of different configurations and arrangements, and the various embodiments are not limited to only the illustrated arrays.

Figure 13A:
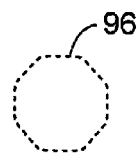
FIGS. 13A-D are diagrams illustrating seams in accordance with various embodiments.
Figure 13B:
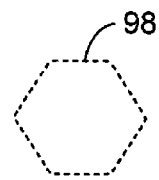
Figure 13C:
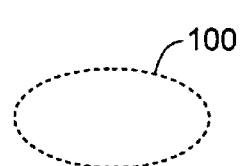
Figure 13D:
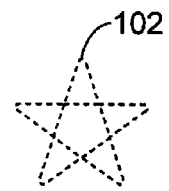

Different seam patterns also may be provided in accordance with various embodiments. For example, polygonal seam patterns may be provided, such as the octagonal seam 96 shown in FIG. 13A or the hexagonal seam 98 shown in FIG. 13B. Other example of seams includes an oval seam 100 shown in FIG. 13C or a star shaped seam 102 as shown in FIG. 13D. Other patterns and shapes are contemplated and the ones described herein are merely for illustration.

Thus, the sewing in various embodiments is independent of the orientation of the tether 34 or the main fabric panel, such as the front panel 40 or the rear panel 42. Thus, the tether 34 may be sewn to the fabric panel such that the tether 34 is not aligned with a deployment or load direction of the inflatable cushion 22.

Figure 14:
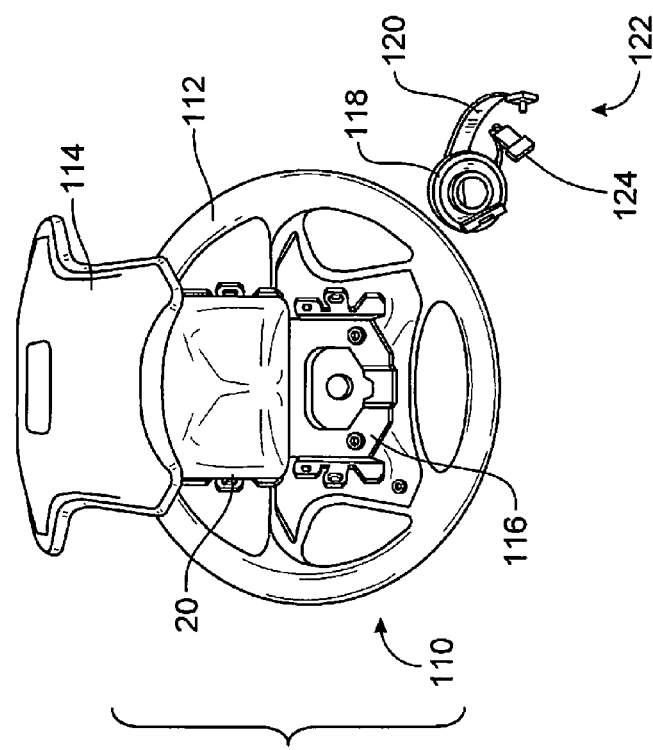
FIG. 14 is a diagram illustrating an inflatable cushion within a steering wheel assembly in accordance with an embodiment.

The inflatable cushion assembly 20 with the inflatable cushion 22 having one or more tethers 34 sewn thereto in accordance with the various embodiments, may be installed in steering wheel assembly 110 as shown in FIG. 14. In particular, the inflatable cushion assembly 20 is mounted to a steering wheel 112 under a cover 114. In some embodiments, a retainer 116 is coupled to the steering wheel 112, with the inflatable cushion assembly 20 mounted to a front side of the retainer 116.

Figure 15:
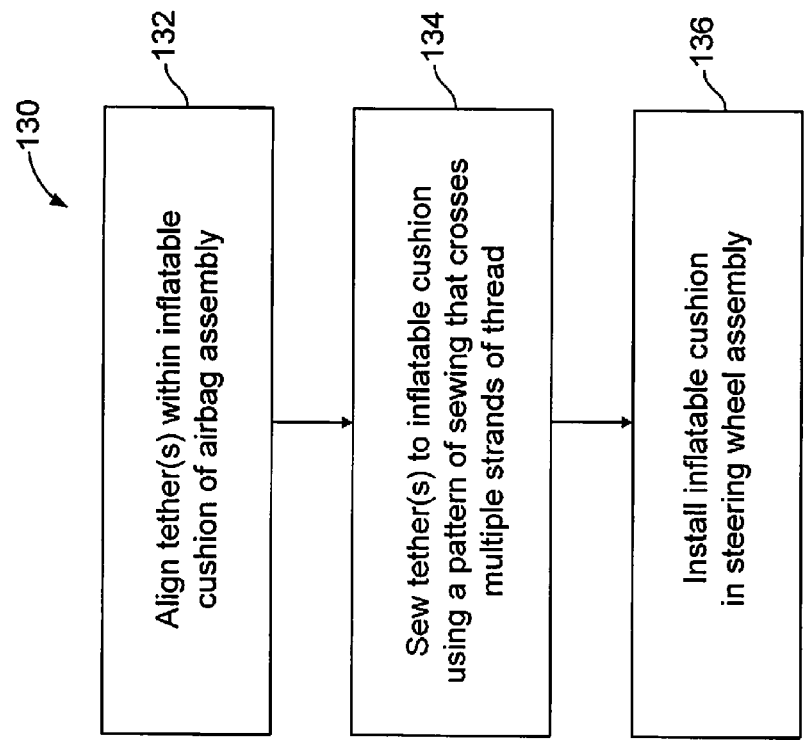
FIG. 15 is a flowchart of a method for attaching one or more tethers to an inflatable cushion assembly in accordance with various embodiments.

A method 130 as shown in FIG. 15 also may be provided for attaching one or more tethers to an inflatable cushion of an airbag assembly. The method 130 includes at 132 aligning one or more tethers within an inflatable cushion for an airbag assembly. The alignment may be provided in any suitable manner and in any orientation with respect to the inflatable cushion. For example, the tether(s) may be aligned such that when the tether(s) are attached to the inflatable cushion, a desired or required expansion or deformation of the inflatable cushion is provided.

Thereafter, at 134 the tether(s) are attached to the inflatable cushion. In particular, the tether(s) are sewn to the inflatable cushion using a pattern of stitching as described herein. The tether(s) may be attached at one or more different areas of the inflatable cushion at one or more attachment points of the tether(s). The pattern of stitching in various embodiments crosses multiple strands of thread along single axis or direction, such as along a direction of deployment. The stitching may be performed, for example, using any suitable sewing apparatus and thread to secure the tether(s) to the inflatable cushion.

Additional preparation steps may also be performed as is known in the art. Thereafter, the inflatable cushion is installed in the steering wheel assembly at 136. For example, suitable brackets or fasteners may be used to couple the inflatable cushion within the steering wheel assembly.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An inflatable cushion assembly for a vehicle, the inflatable cushion assembly comprising:
   an inflatable cushion having an interior;
   a tether disposed within the interior of the inflatable cushion, the tether having at least one portion attached to the interior of the inflatable cushion; and
   a circuitous stitching at the portion attaching the tether to the interior of the inflatable cushion, wherein the circuitous stitching comprises a plurality of non-concentric adjacent circular stitches and a plurality of non-concentric adjacent spiral stitches defining a sewing pattern that crosses a plurality of strands of thread along a load direction to concentrate a load during deployment of the inflatable cushion in more than one strand, wherein the circuitous stitching comprising the plurality of circular stitches in an alternating pattern with the plurality of spiral stitches.

2. The inflatable cushion assembly of claim 1, wherein the plurality of circular stitches cross multiple lines of threads of the stitches along a single direction and define one of a wave array or an arc array.

3. The inflatable cushion assembly of claim 1, wherein the plurality of circular stitches define a plurality of adjacent circular stitches arranged along a single axis and non-overlapping with each other.

4. The inflatable cushion assembly of claim 1, further comprising a plurality of separate spiral stitches defining an array of non-overlapping spiral seams having a pattern of sewing that crosses multiple strands of threads along a single load direction.

5. The inflatable cushion assembly of claim 4, wherein the plurality of spiral stitches comprise at least portions of concentric spirals.

6. The inflatable cushion assembly of claim 4, wherein the plurality of spiral stitches are formed in a continuous stitching pattern and define one of a wave array or an arc array.

7. The inflatable cushion assembly of claim 1, wherein the circuitous stitching extends in a direction perpendicular to a longitudinal axis of the tether.

8. The inflatable cushion assembly of claim 1, wherein the tether is attached at any location or orientation of the interior of the inflatable cushion.

9. The inflatable cushion assembly of claim 1, wherein the tether comprises tether portions coupled together with the circuitous stitching.

10. The inflatable cushion assembly of claim 1, wherein the circuitous stitching comprises a sewing pattern that crosses a plurality of strands of thread along a single load direction.

11. The inflatable cushion assembly of claim 1, wherein the circuitous stitching is not a box stitch pattern and the inflatable cushion is mounted to a steering wheel.

12. A method for attaching a tether to an inflatable cushion of an airbag assembly, the method comprising:
    aligning at least one tether with a panel of an inflatable cushion of an airbag assembly; and
    sewing the tether to the panel using a circuitous stitching pattern that crosses a plurality of lines of thread in one direction, wherein the circuitous stitching comprises a plurality of non-concentric adjacent circular stitches and a plurality of non-concentric adjacent spiral stitches defining a sewing pattern that crosses a plurality of strands of thread along a load direction to concentrate a load during deployment of the inflatable cushion in more than one strand, wherein the circuitous stitching pattern comprises a plurality of alternating circular stitching patterns and spiral stitching patterns.

13. The method of claim 12, wherein the aligning is at an orientation aligned with a single deployment direction of the inflatable cushion.

\* \* \* \* \*